(12) United States Patent
Griggs

(10) Patent No.: US 12,699,309 B2
(45) Date of Patent: Aug. 4, 2026

(54) LOW PROFILE LENS ADAPTER WITH FOLDED OPTICS

(71) Applicant: GoPro, Inc., San Mateo, CA (US)

(72) Inventor: Ian Copeland Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 440 days.

(21) Appl. No.: 18/227,003

(22) Filed: Jul. 27, 2023

(65) Prior Publication Data

US 2024/0045182 A1 Feb. 8, 2024

Related U.S. Application Data

(60) Provisional application No. 63/394,668, filed on Aug. 3, 2022.

(51) Int. Cl.
G03B 17/56 (2021.01)
G02B 13/00 (2006.01)

(52) U.S. Cl.
CPC ....... G03B 17/565 (2013.01); G02B 13/0065 (2013.01)

(58) Field of Classification Search
CPC .................................................. G03B 17/565
See application file for complete search history.

(56) References Cited

U.S. PATENT DOCUMENTS

| | | | | |
|---|---|---|---|---|
| 1,631,303 A | * | 6/1927 | Washington | ........... G03B 13/20 |
| | | | | 396/152 |
| 7,808,718 B2 | * | 10/2010 | Frazier | ............... G02B 27/0081 |
| | | | | 359/744 |
| 10,757,304 B2 | * | 8/2020 | Bell | ........................ H04N 23/55 |
| 2010/0328420 A1 | * | 12/2010 | Roman | .............. H04N 21/4223 |
| | | | | 348/E7.083 |

OTHER PUBLICATIONS

DPReview article titled "Olloclip launches telephoto lens with interchangeable circular polarizing lens" published Jun. 26, 2013 at https://www.dpreview.com/reviews/inmacus-wide-angle-lens-kit-review (retrieved Nov. 20, 2025) (Year: 2013).*

* cited by examiner

*Primary Examiner* — Leon W Rhodes, Jr.
(74) *Attorney, Agent, or Firm* — Young Basile Hanlon & MacFarlane, P.C.

(57) ABSTRACT

A lens adapter is attached to an image capture device to lower the profile of the image capture device when mounted to a mounting device. The lens adapter includes a lens that refracts light incident from an outer lens of the lens adapter into collimated light. The lens adapter includes an optical device that alters the direction of the collimated light and directs the collimated light to an image capture device lens assembly.

20 Claims, 9 Drawing Sheets

LOW PROFILE LENS ADAPTER WITH FOLDED OPTICS

CROSS-REFERENCE TO RELATED APPLICATION(S)

This application claims priority to and the benefit of U.S. Provisional Patent Application No. 63/394,668, filed Aug. 3, 2022, the entire disclosure of which is hereby incorporated by reference.

TECHNICAL FIELD

This disclosure relates to image capture devices. In particular, this disclosure relates to detachable lens adapters for use with image capture devices.

SUMMARY

Disclosed herein are implementations of a lens adapter and an image capture system for reducing the profile of an image capture device using folded optics. In an aspect, a lens adapter for an image capture device may include a first lens assembly, an optical device, and a mount end. The first lens assembly may include one or more lenses configured to refract light incident from an outer lens of the lens adapter into collimated light. The optical device may be configured to alter a direction of the collimated light and direct the collimated light to an image capture device lens assembly. The mount end may be configured to removably attach the lens adapter to the image capture device.

In an aspect, an image capture system includes an image capture device and a lens adapter. The image capture device may include a first lens assembly and a mounting interface. The lens adapter may include a second lens assembly, an optical device, and a mount end. The second lens assembly may include one or more lenses configured to refract light incident from an outer lens of the lenses into collimated light. The optical device may be configured to alter a direction of the collimated light and direct the collimated light to the first lens assembly. The mount end may be configured to removably attach the lens adapter to the mounting interface of the image capture device.

In an aspect, an image capture system includes a lens adapter and an image capture device. The image capture device may include a first lens assembly and a mounting interface. The mounting interface may be configured to attach the lens adapter in a top-facing configuration or a side-facing configuration. The lens adapter may include a second lens assembly, an optical device, and a mount end. The second lens assembly may include one or more lenses that are configured to refract light incident from an outer lens of the one or more lenses into collimated light. The optical device may be configured to alter a direction of the collimated light and direct the collimated light to the first lens assembly. The mount end may be configured to removably attach the lens adapter to the mounting interface of the image capture device.

In one or more aspects, the optical device may be a front silvered mirror. The optical device may be at any angle, such as, for example, about 45 degrees. In one or more aspects, the optical device may be a prism. In one or more aspects, the optical device may be glass, plastic, or ceramic. In one or more aspects, the lens adapter may include a second mount configured to removably attach a secondary lens to the lens adapter. In one or more aspects, the mount end may include a swivel mechanism to variably adjust the direction of the lens adapter. In one or more aspects, the mount end may be configured to removably attach the lens adapter to the image capture device in a top-facing configuration. In one or more aspects, the mount end may be configured to removably attach the lens adapter to the image capture device in a side-facing configuration. In one or more aspects, the mounting interface may be configured to attach the lens adapter in a top-facing configuration. In one or more aspects, the mounting interface may be configured to attach the lens adapter in a side-facing configuration.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

When an image capture device is mounted to a helmet, an unmanned aerial vehicle (UAV), or some other mounting device, the size of the image capture device and/or orientation of a front-facing lens of the image capture device causes the image capture device to protrude awkwardly from the mounting device, generate excess air resistance, or both. Typical lens adapters are configured to attach to the front-facing lens of an image capture device without changing the profile of the image capture device when mounted to a mounting device. Devices to reduce the profile of the image capture device when mounted to a mounting device are needed.

Disclosed herein are implementations of a lens adapter for image capture devices that reduce the profile of the image capture device, particularly when the image capture device is mounted to a mounting device. The lens adapter may be detachable from the image capture device. The lens adapter may include an optical device that enables an image capture of a scene using an image capture device with a front-facing lens, such that the image capture of the scene is obtained from a side of the image capture device or the top of the image capture device, thereby reducing the profile of the image capture device. For example, the lens adapter enables the image capture to be obtained along the X-axis (e.g., side of the image capture device) or the Y-axis (e.g., top of the image capture device), and send the optics into the Z-axis to use the same integrated sensor lens assembly (ISLA) in the image capture device body. The ISLA in the image capture device body may be referred to as a mother lens.

Figure 1A:
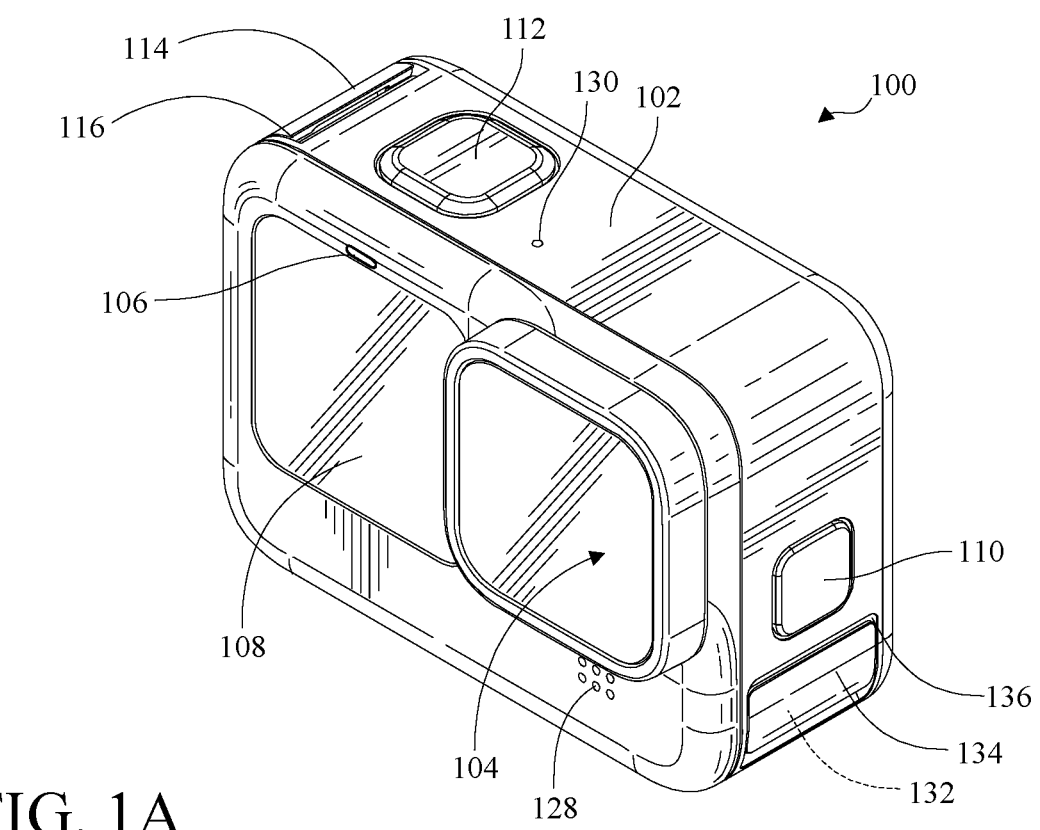
FIGS. 1A-1B are isometric views of an example of an image capture apparatus.
Figure 1B:
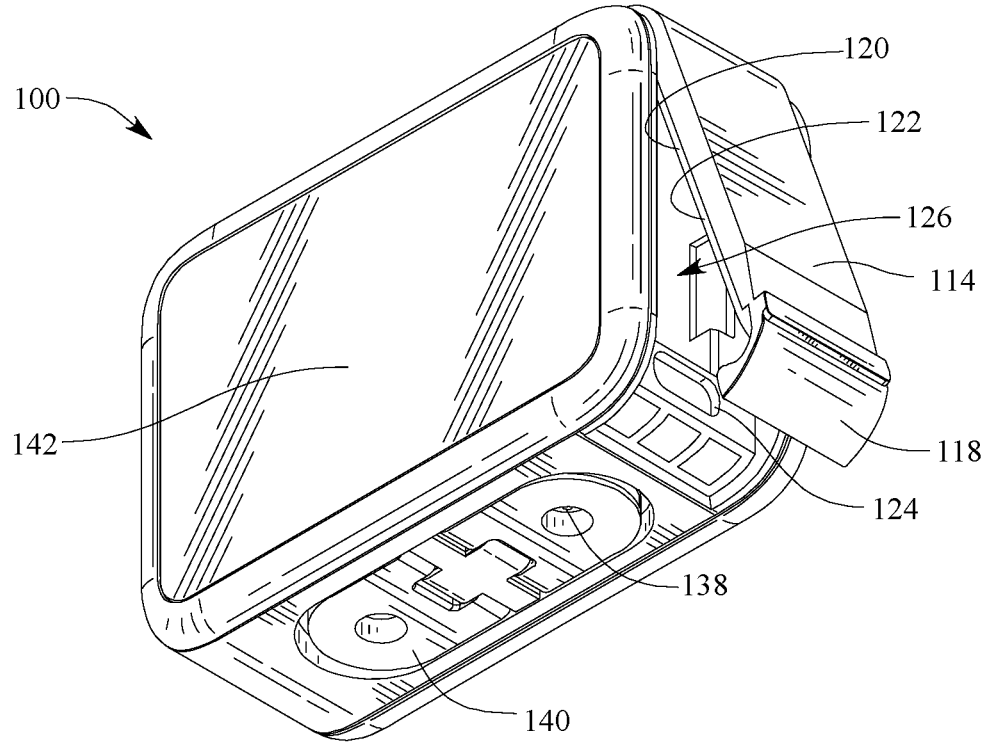
Figure 3:
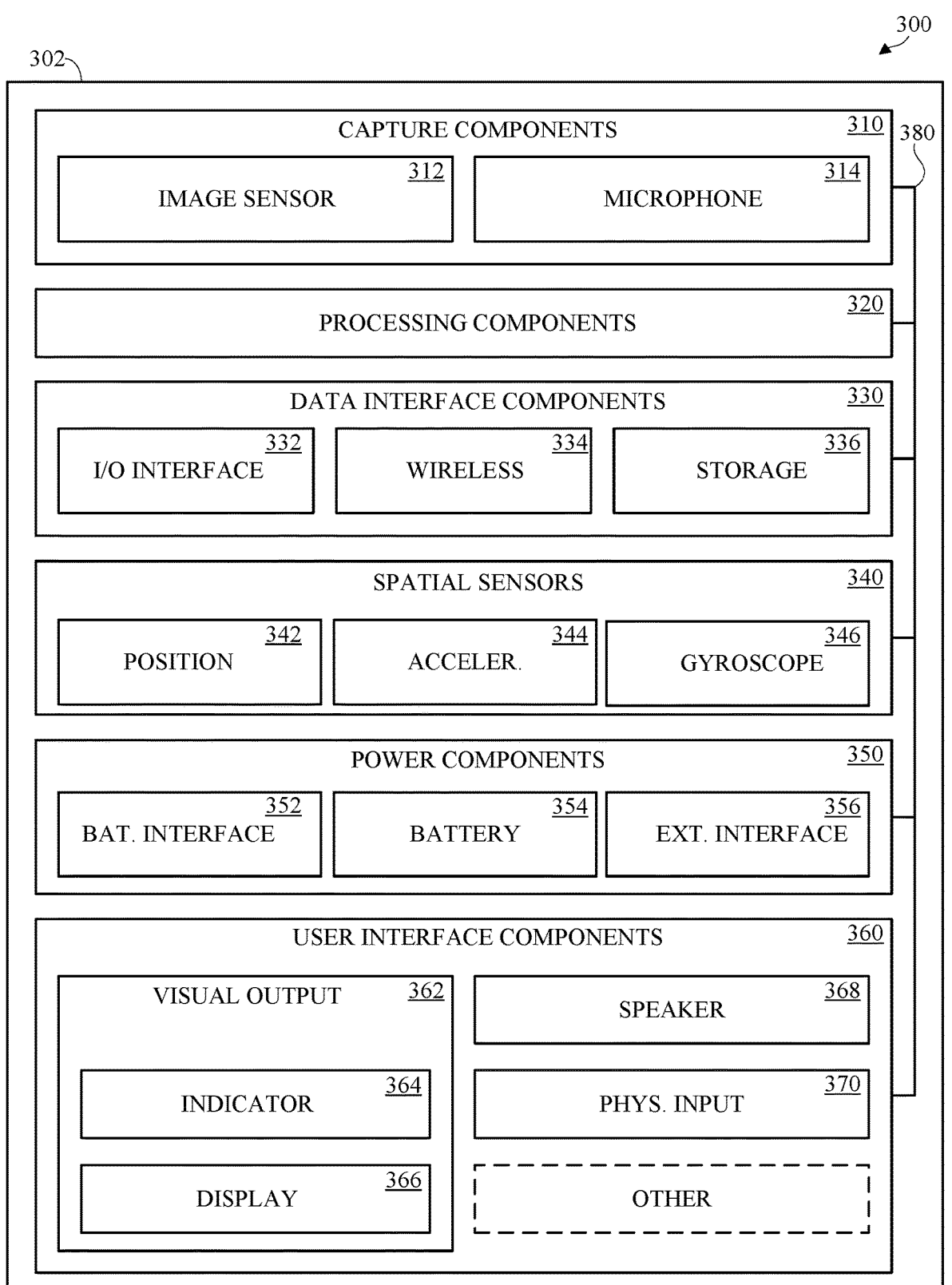
FIG. 3 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
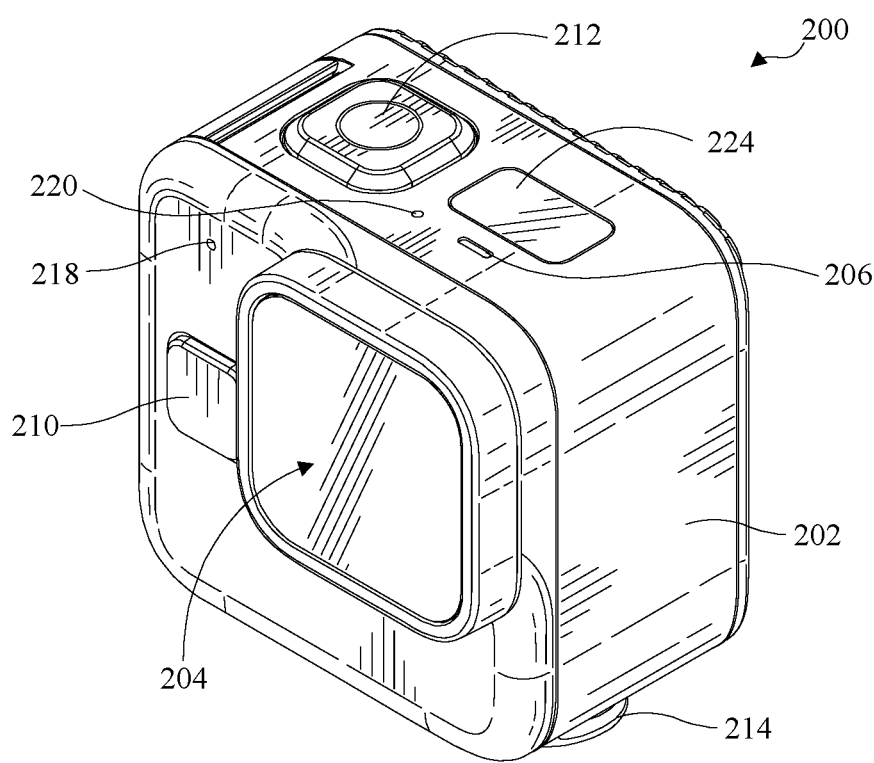
FIGS. 2A-2B are isometric views of another example of an image capture apparatus.
Figure 2B:
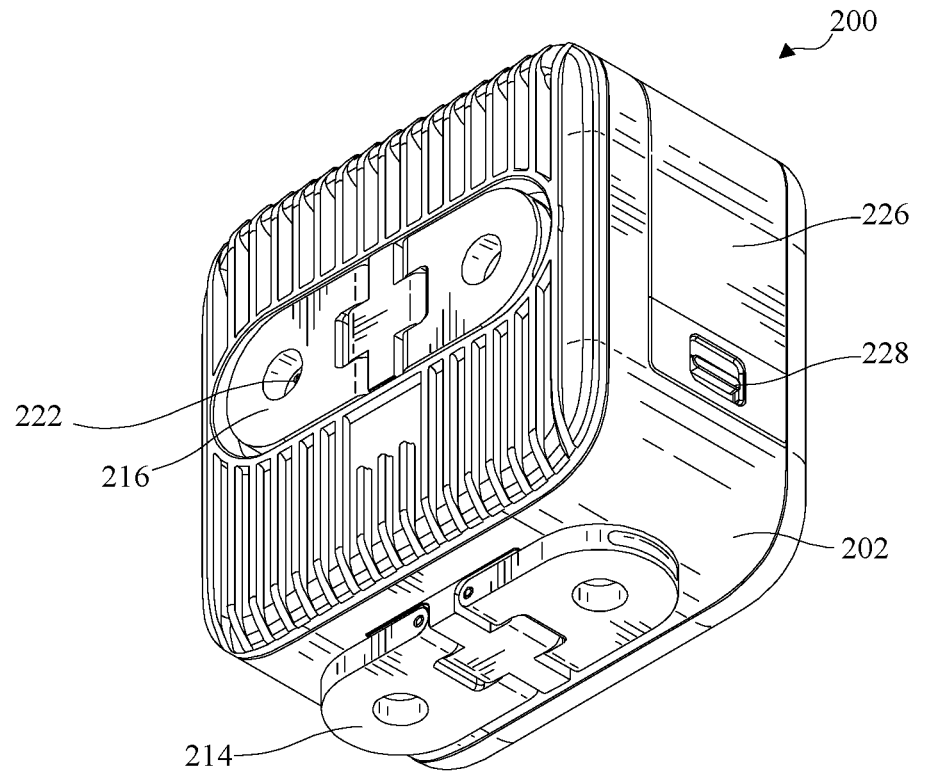

FIGS. 2A-2B illustrate another example of an image capture apparatus 200. The image capture apparatus 200 is similar to the image capture apparatus 100 shown in FIGS. 1A-1B. The image capture apparatus 200 includes a body 202, an image capture device 204, an indicator 206, a mode button 210, a shutter button 212, interconnect mechanisms 214, 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The image capture device 204 is structured on a front surface of the body 202. The image capture device 204 includes a lens and may be similar to the image capture device 104 shown in FIG. 1A.

As shown in FIG. 2A, the image capture apparatus 200 includes the indicator 206 on a top surface of the body 202. The indicator 206 may be similar to the indicator 106 shown in FIG. 1A. The indicator 206 may indicate a status of the image capture device 204. Although one indicator 206 is shown in FIGS. 2A, the image capture apparatus 200 may include other indictors structured on respective surfaces of the body 202.

As shown in FIGS. 2A, the image capture apparatus 200 includes input mechanisms including the mode button 210, structured on a front surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanisms 214, 216, with a first interconnect mechanism 214 structured on a bottom surface of the body 202 and a second interconnect mechanism 216 disposed within a rear surface of the body 202. The interconnect mechanisms 214, 216 may be similar to the interconnect mechanism 140 shown in FIG. 1B.

As shown in FIGS. 2A-2B, the image capture apparatus 200 includes the audio components 218, 220, 222 respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a rear surface of the body 202. Other numbers and configurations for the audio components 218, 220, 222 may be used.

As shown in FIG. 2A, the image capture apparatus 200 includes the display 224 structured on a front surface of the body 202. The display 224 may be similar to the displays 108, 142 shown in FIGS. 1A-1B. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 shown in FIG. 2B includes the release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B or the image capture apparatus 200 shown in FIGS. 2A-2B, may be implemented as shown in FIG. 3.

The image capture apparatus 300 includes a body 302. The body 302 may be similar to the body 102 shown in FIGS. 1A-1B, the body 202 shown in FIGS. 2A-2B, or the body 202 shown in FIGS. 2A-2B. The body 302 includes electronic components such as capture components 310, processing components 320, data interface components 330, spatial sensors 340, power components 350, user interface components 360, and a bus 380.

The capture components 310 include an image sensor 312 for capturing images. Although one image sensor 312 is shown in FIG. 3, the capture components 310 may include multiple image sensors. The image sensor 312 may be similar to the image sensors 342, 346 shown in FIG. 3. The image sensor 312 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 312 detects light, such as within a defined spectrum, such as the visible light spectrum or the infrared spectrum, incident through a corresponding lens. The image sensor 312 captures detected light as image data and conveys the captured image data as electrical signals (image signals or image data) to the other components of the image capture apparatus 300, such as to the processing components 320, such as via the bus 380.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIGS. 1A-1B or the audio components 218, 220, 222 shown in FIGS. 2A-2B.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 380. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include executable instructions and data that can be accessed by the processing components 320.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1B.

The wireless data interface 334 may send, receive, or both, wireless electronic communications signals. The wireless data interface 334 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1B.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1B.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1B. The external power interface 356 obtains or receives power from an external source, such as a wall plug or external battery, and distributes the power to the components of the image capture apparatus 300, which may include distributing power to the battery 354 via the battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 364 and a display 366. The indicator 364 may be similar to the indicator 106 shown in FIG. 1A or the indicator 206 shown in FIG. 2A. The display 366 may be similar to the display 108 shown in FIG. 1A, the display 142 shown in FIG. 1B, or the display 224 shown in FIG. 2A. Although the visual output components 362 are shown in FIG. 3 as including one indicator 364, the visual output components 362 may include multiple indicators. Although the visual output components 362 are shown in FIG. 3 as including one display 366, the visual output components 362 may include multiple displays. In some implementations, one or more of the indicator 364 or the display 366 may be omitted or combined.

As shown in FIG. 3, the user interface components 360 include a speaker 368. The speaker 368 may be similar to the speaker 138 shown in FIG. 1B or the audio components 218, 220, 222 shown in FIGS. 2A-2B. Although one speaker 368 is shown in FIG. 3, the user interface components 360 may include multiple speakers. In some implementations, the speaker 368 may be omitted or combined with another component of the image capture apparatus 300, such as the microphone 314.

As shown in FIG. 3, the user interface components 360 include a physical input interface 370. The physical input interface 370 may be similar to the mode button 110 shown in FIG. 1B or the shutter button 112 shown in FIG. 1A. Although one physical input interface 370 is shown in FIG. 3, the user interface components 360 may include multiple physical input interfaces. In some implementations, the physical input interface 370 may be omitted or combined with another component of the image capture apparatus 300. The physical input interface 370 may be, for example, a button, a toggle, a switch, a dial, or a slider.

As shown in FIG. 3, the user interface components 360 include a broken line border box labeled "other" to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

Figure 4:
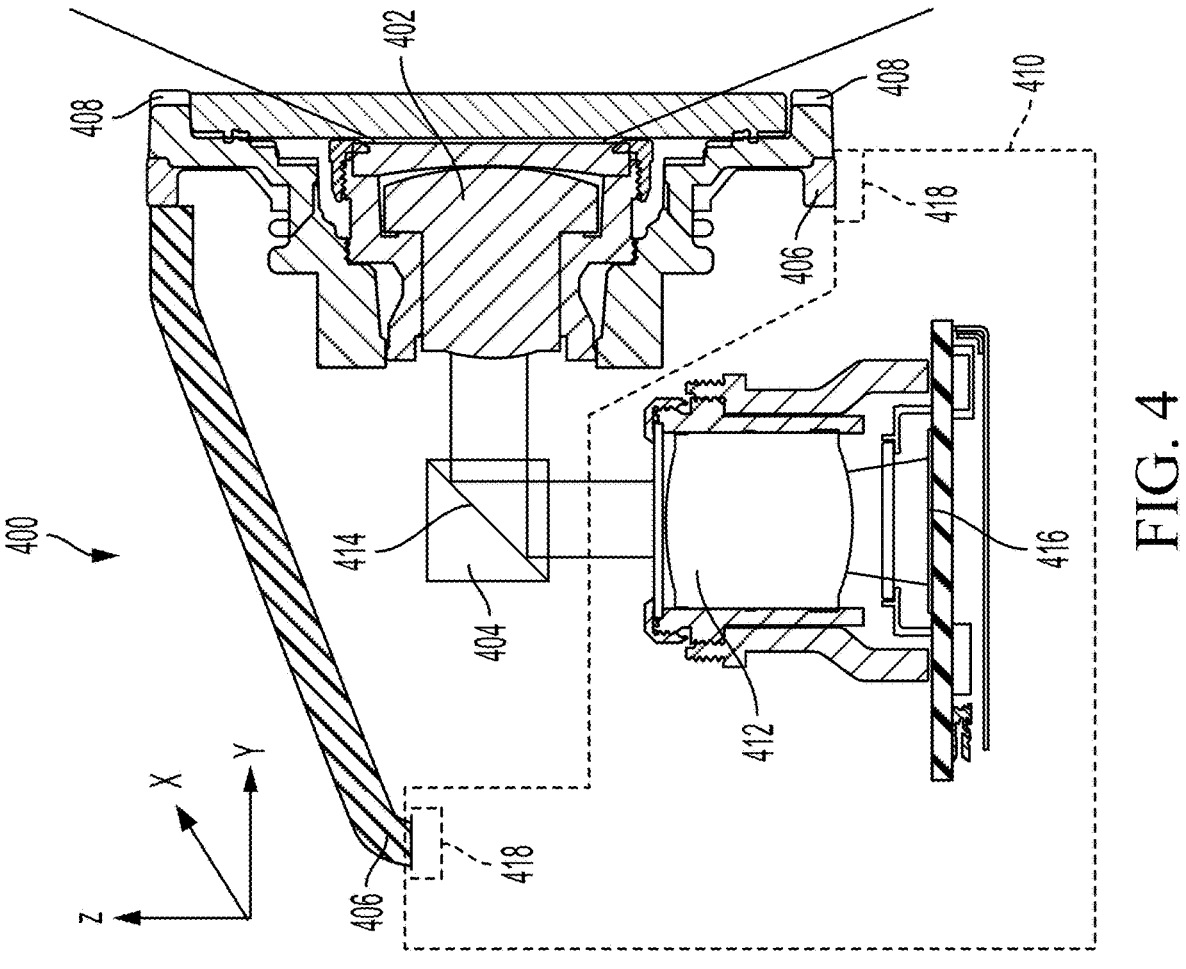
FIG. 4 is a cross-sectional side-view of an example of a lens adapter.

FIG. 4 is a cross-sectional side-view of an example of a lens adapter 400. The lens adapter 400 can be used with image capture device 100 shown in FIGS. 1A-B and image capture device 200 shown in FIGS. 2A-B. The lens adapter 400 includes a lens 402, an optical device 404, a first mounting end 406, and a second mounting end 408. The lens adapter 400 is configured to enable image capture of a scene using an image capture device 410 with a front-facing lens (not shown), such that the image capture of the scene is obtained from a side of an image capture device 410 or a top of the image capture device 410, thereby reducing the profile of the image capture device 410.

The lens 402 of the lens adapter 400 is configured to collimate light using one or more elements. The lens 402 may be referred to as a daughter lens. The lens 402 may be an ISLA and include the one or more elements. In some implementations, the lens adapter 400 may include one or more actuators (not shown) for auto-focus or optical image stabilization functionality. The second mounting end 408 of the lens adapter 400 is configured to attach various optical components to the lens adapter 400, such optical components having different fields of view (FOVs), different filters, and/or different apertures based on the particular use case.

The optical device 404 of the lens adapter 400 includes an optical element 414 such as a silvered mirror or a prism. The optical element 414 can be glass, plastic, ceramic, or any other material that can redirect light. The optical device 404 is configured to redirect the collimated light from the lens 402 to the lens 412 of the image capture device 410. The optical element 414 may be positioned at about a 45-degree angle relative to the lens 402 such that the optical device 404 is configured to redirect the collimated light about 90 degrees to the lens 412 of the image capture device 410. In some implementations, the optical device 404 may be configured to redirect the collimated light at another angle, such as about 80 degrees or about 120 degrees, based on the particular use case. The lens 412 is configured to direct the collimated light from the lens 402 to an image sensor 416 of the image capture device 410.

The image capture device 410 includes a mounting interface 418. The mounting interface 418 is configured to secure the first mounting end 406 of the lens adapter 400 to the image capture device 410. For example, the mounting interface 418 may include a slot that engages with a tab of the first mounting end 406, a magnet that engages with a ferritic material of the first mounting end 406, a hinge that rotatably couples with a pin of the first mounting end 406, or any other mounting mechanism (not shown) that supports sealing engagement between the lens adapter 400 and the image capture device 410. The lens adapter 400 may be permanently attached to the image capture device 410 or removably attached to the image capture device 410. In some implementations, the mounting interface 522 may be configured as a swivel mechanism such that the lens adapter 400 can be adjustably attached to the image capture device 410 to allow for a user to variably adjust a direction of an imaging axis (depicted as the Y-axis) of the lens 402 of the lens adapter 400 to the X-axis, for example.

Figure 5A:
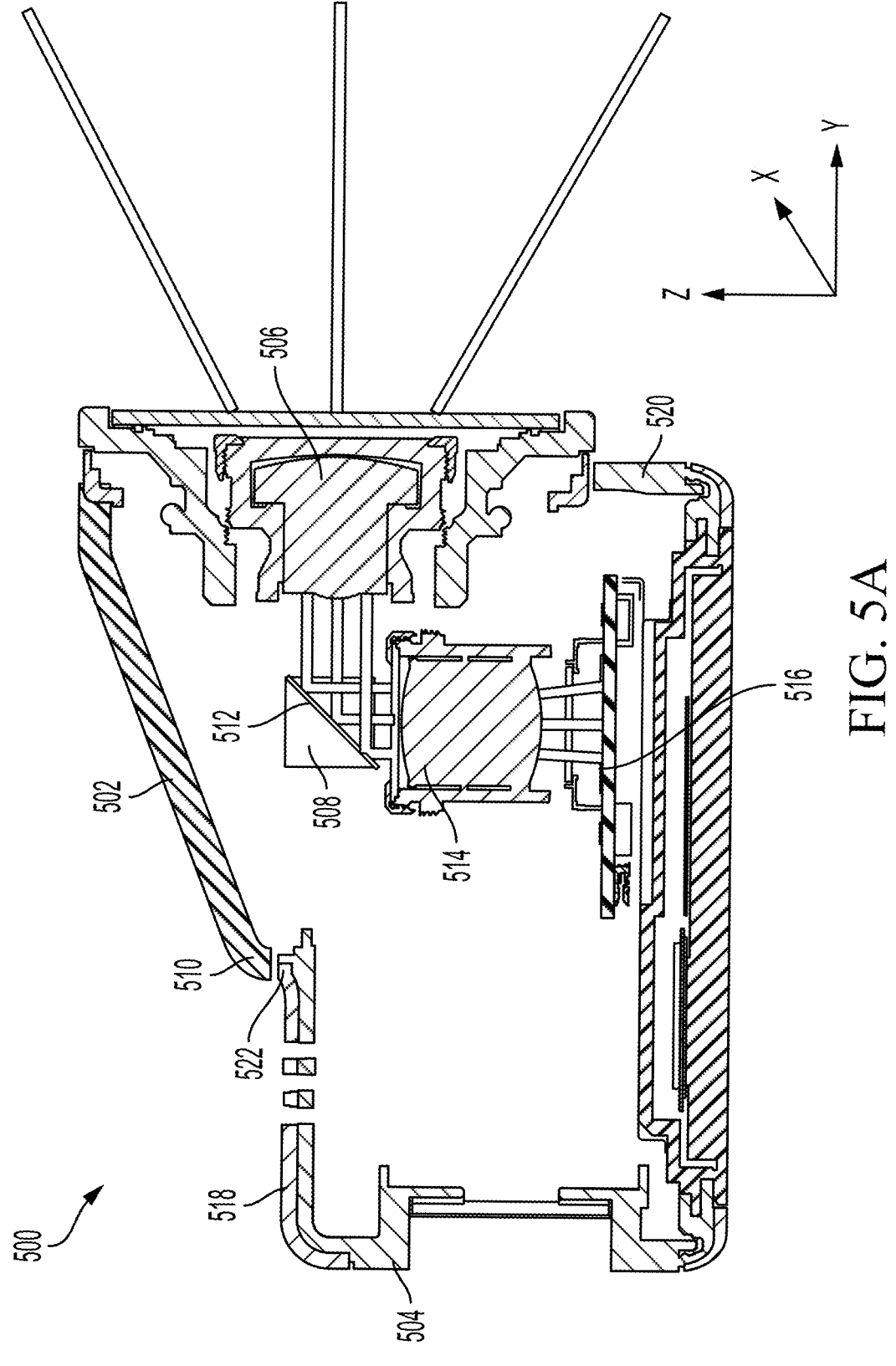
FIG. 5A is a cross-sectional side-view of an example of an image capture system showing a lens adapter attached to an image capture device in a top-facing configuration.

FIG. 5A is a cross-sectional side view of an example of an image capture system 500 showing a lens adapter 502 attached to an image capture device 504 in a top-facing configuration. The lens adapter 502 includes a lens 506, an optical device 508, and a mounting end 510. In this example, the lens adapter 502 is configured to enable image capture of a scene using the image capture device 504 that has a front-facing lens (not shown), such that the image capture of the scene is obtained from the top of the image capture device 504, thereby reducing the profile of the image capture device 504.

The lens 506 of the lens adapter 502 is configured to collimate light using one or more elements. The lens 506 may be referred to as a daughter lens. The lens 506 may be an ISLA and include the one or more elements. In some implementations, the lens adapter 502 may include one or more actuators (not shown) for auto-focus or optical image stabilization functionality. In some implementations, the lens adapter 502 may include one or more mounting ends, such as the second mounting end 408 shown in FIG. 4, that are configured to attach various optical components having different FOVs, different filters, and/or different apertures based on the particular use case.

The optical device 508 of the lens adapter 502 includes an optical element 512 such as a silvered mirror or a prism. The optical element 512 can be glass, plastic, ceramic, or any other material that can redirect light. The optical device 508 is configured to redirect the collimated light from the lens 506 to a lens 514 of the image capture device 504. The optical element 512 may be positioned at about a 45-degree angle relative to the lens 506 such that the optical device 508 is configured to redirect the collimated light about 90 degrees to the lens 514 of the image capture device 504. In some implementations, the optical device 508 may be configured to redirect the collimated light at another angle, such as about 70 degrees, based on the particular use case. The lens 514 of the image capture device may be an ISLA that includes one or more elements. The lens 514 may be referred to as a mother lens. The lens 514 is configured to direct the collimated light from the lens 506 to an image sensor 516 of the image capture device 504.

The image capture device 504 has a front-facing portion 518 and a top-facing portion 520. The front-facing portion 518 is aligned along the Z-axis and the top-facing portion 520 is aligned along the Y-axis. The image capture device 504 includes a mounting interface 522. The mounting interface 522 is configured to secure the mounting end 510 of the lens adapter 502 to the image capture device 504. For example, the mounting interface 522 may include a slot that engages with a tab of the mounting end 510, a magnet that engages with a ferritic material of the mounting end 510, a hinge that rotatably couples with a pin of the mounting end 510, or any other mounting mechanism (not shown) that supports sealing engagement between the lens adapter 502 and the image capture device 504. The lens adapter 502 may be permanently attached to the image capture device 504 or removably attached to the image capture device 504. In some implementations, the mounting interface 522 may be configured as a swivel mechanism such that the lens adapter 502 can be adjustably attached to the image capture device 504 to allow for a user to variably adjust a direction of an imaging axis (depicted as the Y-axis) of the lens 506 of the lens adapter 502 to the X-axis, for example.

Figure 5B:
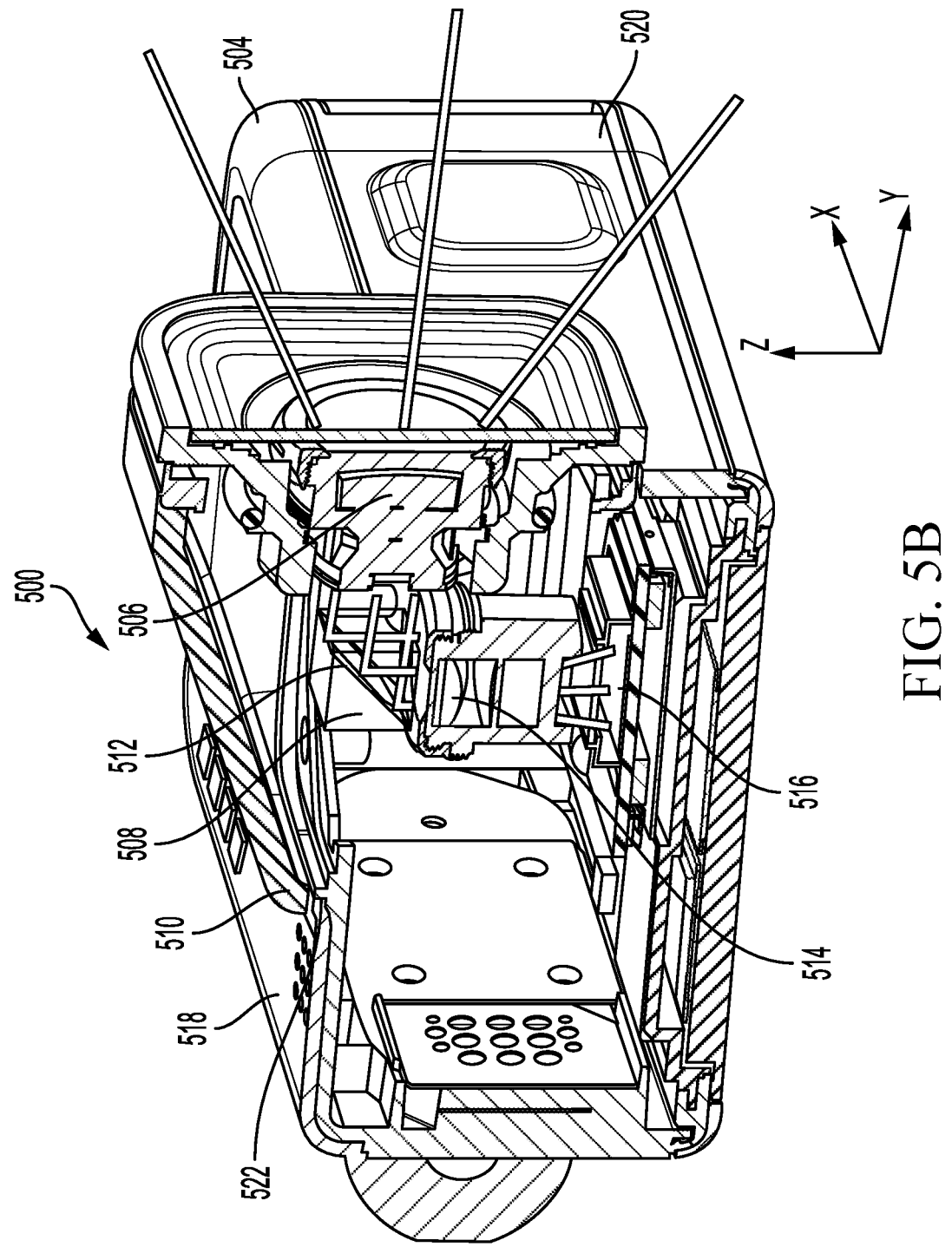
FIG. 5B is a cutaway perspective view of an example of the image capture system shown in FIG. 5A with a lens adapter attached to an image capture device in a top-facing configuration.

FIG. 5B is a cutaway perspective view of an example of the image capture system 500 shown in FIG. 5A with the lens adapter 502 attached to the image capture device 504 in a top-facing configuration. The lens adapter 502 includes a lens 506, an optical device 508, and a mounting end 510. In this example, the lens adapter 502 is configured to enable an image capture of a scene using the image capture device 504 that has a front-facing lens, such that the image capture of the scene is obtained from the top of the image capture device 504, thereby reducing the profile of the image capture device 504.

The lens 506 is configured to collimate light using one or more elements. The lens 506 may be referred to as a daughter lens. The lens 506 may be an ISLA and include the one or more elements. In some implementations, the lens adapter 502 may include one or more actuators for auto-focus or optical image stabilization functionality. In some implementations, the lens adapter 502 may include one or more mounting ends, such as the second mounting end 408 shown in FIG. 4, that are configured to attach various optical components having different FOVs, different filters, and/or different apertures based on the particular use case.

The optical device 508 includes an optical element 512 such as a silvered mirror or a prism. The optical element 512 can be glass, plastic, ceramic, or any other material that can redirect light. The optical device 508 is configured to redirect the collimated light from the lens 506 to a lens 514 of the image capture device 504. The optical element 512 may be positioned at about a 45 degree angle relative to the lens 506 such that the optical device 508 is configured to redirect the collimated light about 90 degrees to the lens 514 of the image capture device 504. In some implementations, the optical device 508 may be configured to redirect the collimated light at another angle, such as about 60 degrees, based on the particular use case. The lens 514 of the image capture device may be an ISLA that includes one or more elements. The lens 514 may be referred to as a mother lens. The lens 514 is configured to direct the collimated light from the lens 506 to an image sensor 516 of the image capture device 504.

The image capture device 504 has a front-facing portion 518 and a top-facing portion 520. The front-facing portion 518 is aligned along the Z-axis and the top-facing portion 520 is aligned along the Y-axis. The image capture device 504 includes a mounting interface 522. The mounting interface 522 is configured to attach to the mounting end 510 of the lens adapter 502 to attach the lens adapter 502 to the image capture device 504. The lens adapter 502 may be permanently attached to the image capture device 504 or removably attached to the image capture device 504. In some implementations, the lens adapter 502 may include a swivel mechanism such that the lens adapter 502 can be adjustably attached to the image capture device 504 to allow for a user to variably adjust the direction of the lens adapter 502.

Figures 6A, 6B, 6C, 6D:
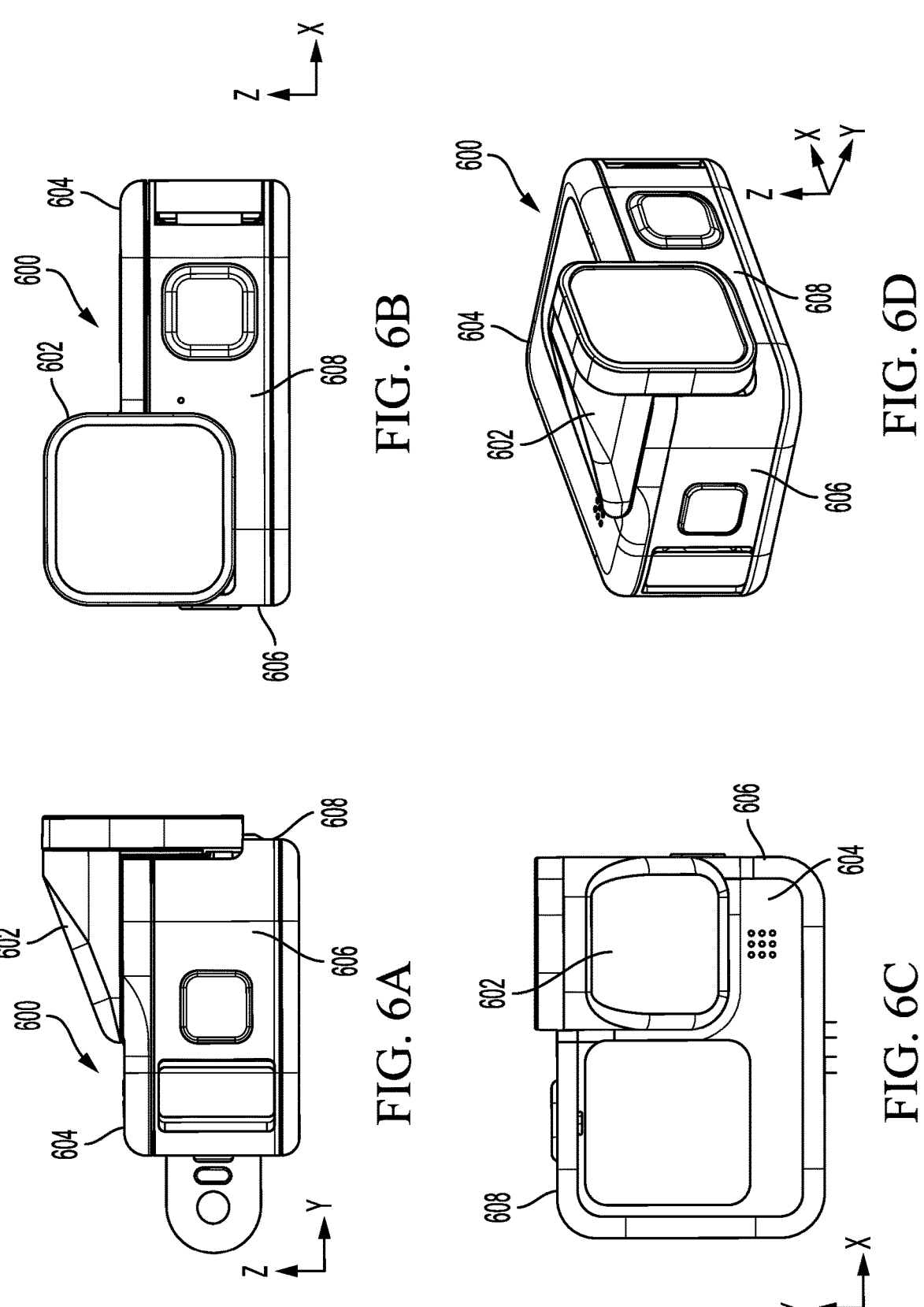
FIG. 6A is a side view of an example of an image capture device with a lens adapter attached in a top-facing configuration.
FIG. 6B is a top view of an example of an image capture device with a lens adapter attached in a top-facing configuration.
FIG. 6C is a front view of an example of an image capture device with a lens adapter attached in a top-facing configuration.
FIG. 6D is a perspective view of an example of an image capture device with a lens adapter attached in a top-facing configuration.

FIGS. 6A-6D show an example of an image capture device 600 in various views with a lens adapter 602 attached in a top-facing configuration. In some implementations, the lens adapter 602 can be attached to the image capture device 600 in a side-facing configuration. The lens adapter 602 is attached to a front-facing portion 604 of the image capture device 600. The front-facing portion 604 of the image capture device 600 is aligned along the Z-axis of the image capture device 600. FIG. 6A is a side view of an example of the image capture device 600 with the lens adapter 602 attached in a top-facing configuration. FIG. 6B is a top view of an example of the image capture device 600 shown in FIG. 6A with the lens adapter 602 attached in a top-facing configuration. FIG. 6C is a front view of an example of the image capture device shown in FIG. 6A with the lens adapter 602 attached in a top-facing configuration. FIG. 6D is a perspective view of an example of the image capture device 600 shown in FIG. 6A with the lens adapter 602 attached in a top-facing configuration.

Referring to FIGS. 6A-6D, in addition to having the front-facing portion 604, the image capture device 600 has a side-facing portion 606 and a top-facing portion 608. The front-facing portion 604 is aligned along the Z-axis, the side-facing portion 606 is aligned along the X-axis, and the top-facing portion 608 is aligned along the Y-axis. The lens adapter 602 may be permanently attached to the image capture device 600 or removably attached to the image capture device 600. In some implementations, the lens adapter 602 may include a swivel mechanism such that the lens adapter 602 can be adjustably attached to the image capture device 600 to allow for a user to variably adjust the direction of the lens adapter 602.

Figures 7A, 7B, 7C, 7D:
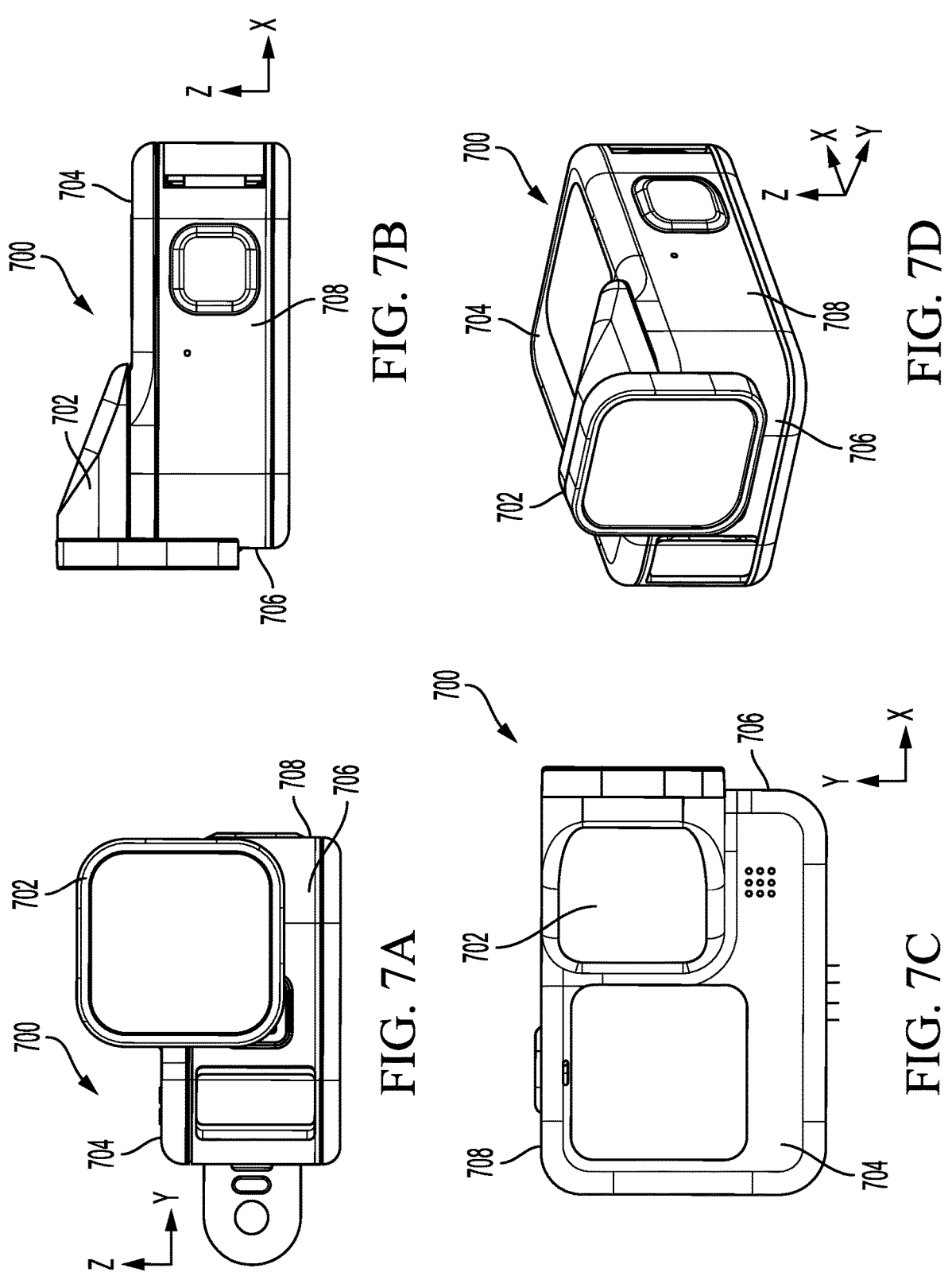
FIG. 7A is a side view of an example of an image capture device with a lens adapter attached in a side-facing configuration.
FIG. 7B is a top view of an example of an image capture device with a lens adapter attached in a side-facing configuration.
FIG. 7C is a front view of an example of an image capture device with a lens adapter attached in a side-facing configuration.
FIG. 7D is a perspective view of an example of an image capture device with a lens adapter attached in a side-facing configuration.

FIGS. 7A-7D show an example of an image capture device 700 in various views with a lens adapter 702 attached in a side-facing configuration. The lens adapter 702 can be attached to the image capture device 700 in a top-facing configuration as well, such as is shown in FIGS. 6A-D with the lens adapter 602. The lens adapter 702 is attached to a front-facing lens of the image capture device 700. The front-facing lens is aligned along the Z-axis of the image capture device 700. FIG. 7A is a side view of an example of the image capture device 700 with the lens adapter 702 attached in a side-facing configuration. FIG. 7B is a top view of an example of the image capture device 700 shown in FIG. 7A with the lens adapter 702 attached in a side-facing configuration. FIG. 7C is a front view of an example of the image capture device 700 shown in FIG. 7A with the lens adapter 702 attached in a side-facing configuration. FIG. 7D is a perspective view of an example of the image capture device 700 shown in FIG. 7A with the lens adapter 702 attached in a side-facing configuration.

Referring to FIGS. 7A-7D, the image capture device 700 has a front-facing portion 704, a side-facing portion 706, and a top-facing portion 708. The front-facing portion 704 is aligned along the Z-axis, the side-facing portion 706 is aligned along the X-axis, and the top-facing portion 708 is aligned along the Y-axis. The lens adapter 702 may be permanently attached to the image capture device 700 or removably attached to the image capture device 700. In some implementations, the lens adapter 702 may include a swivel mechanism such that the lens adapter 702 can be adjustably attached to the image capture device 700 to allow for a user to variably adjust the direction of the lens adapter 702.

Figures 8A, 8B, 8C:
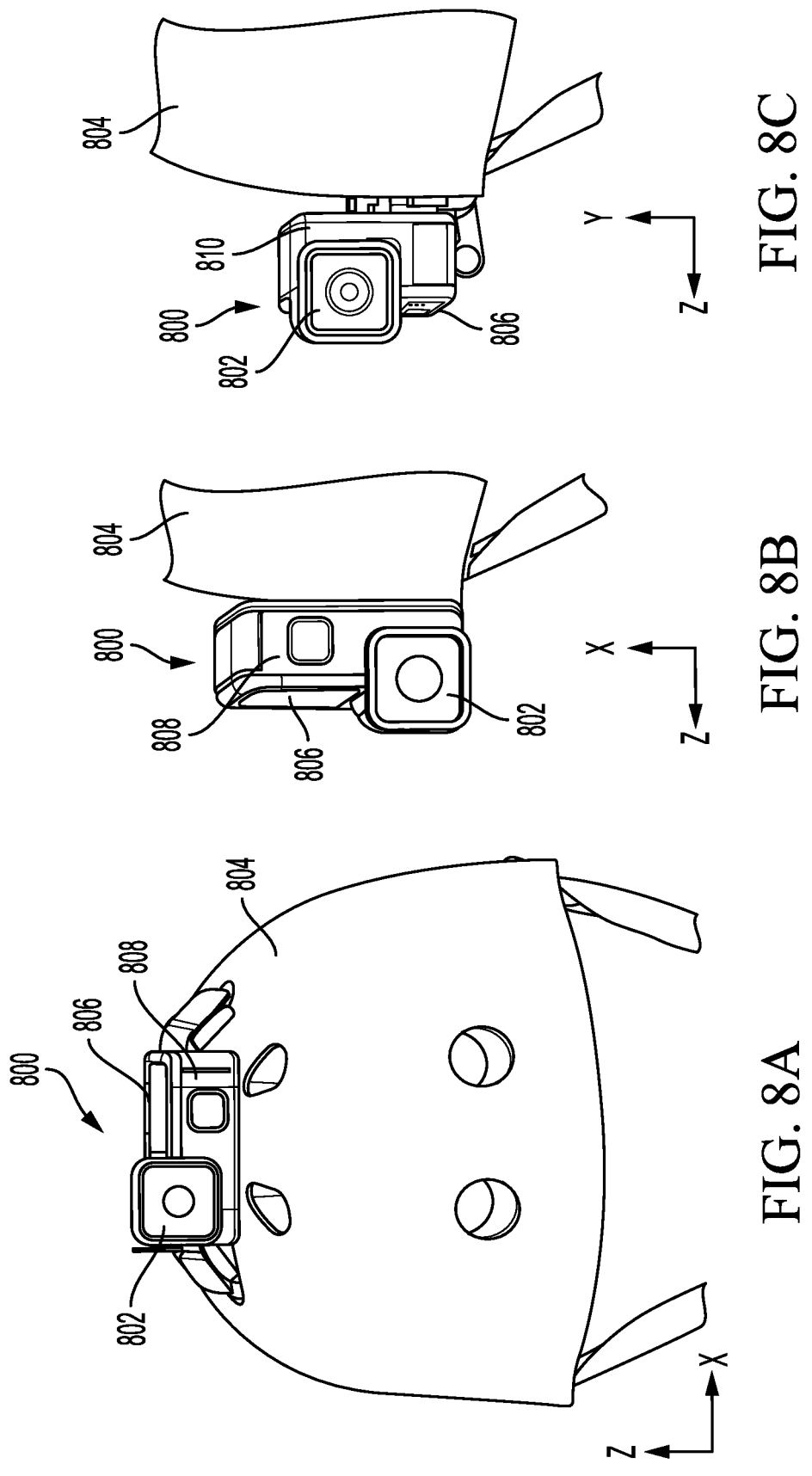
FIG. 8A is a front view of an example of an image capture device with a lens adapter attached in a top-facing configuration that is mounted to the top of a helmet.
FIG. 8B is a front view of an example of an image capture device with a lens adapter attached in a top-facing configuration that is mounted to the side of a helmet.
FIG. 8C is a front view of an example of an image capture device with a lens adapter attached in a side-facing configuration that is mounted to the side of a helmet.

FIG. 8A is a front view of an example of an image capture device 800 with a lens adapter 802 attached in a top-facing configuration that is mounted to the top of a helmet 804. The lens adapter 802 may be the lens adapter 502 shown in FIGS. 5A-5B or the lens adapter 602 shown in FIGS. 6A-6D. The lens adapter 802 is attached to the front-facing lens (not shown) of the image capture device 800. The front-facing lens is aligned along the Z-axis of the image capture device 800. The image capture device 800 has a front-facing portion 806 and a top-facing portion 808. The front-facing portion 806 is aligned along the Z-axis and the top-facing portion 808 is aligned along the Y-axis. The lens adapter 802 may be permanently attached to the image capture device 800 or removably attached to the image capture device 800. In some implementations, the lens adapter 802 may include a swivel mechanism such that the lens adapter 802 can be adjustably attached to the image capture device 800 to allow for a user to variably adjust the direction of the lens adapter 802.

FIG. 8B is a front view of an example of the image capture device 800 shown in FIG. 8A with the lens adapter 802 attached in a top-facing configuration that is mounted to the side of the helmet 804. The lens adapter 802 is attached to the front-facing lens of the image capture device 800. The front-facing lens is aligned along the Z-axis of the image capture device 800. The image capture device 800 has a front-facing portion 806 and a top-facing portion 808. The front-facing portion 806 is aligned along the Z-axis and the top-facing portion 808 is aligned along the Y-axis. The lens adapter 802 may be permanently attached to the image capture device 800 or removably attached to the image capture device 800. In some implementations, the lens adapter 802 may include a swivel mechanism such that the lens adapter 802 can be adjustably attached to the image capture device 800 to allow for a user to variably adjust the direction of the lens adapter 802.

FIG. 8C is a front view of an example of the image capture device 800 shown in FIG. 8A with the lens adapter 802 attached in a side-facing configuration that is mounted to the side of the helmet 804. The lens adapter 802 shown in FIG. 8C may be the lens adapter 702 shown in FIGS. 7A-D. The lens adapter 802 is attached to the front-facing lens of the image capture device. The front-facing lens is aligned along the Z-axis of the image capture device 800. The image capture device 800 has a front-facing portion 806 and a side-facing portion 810. The front-facing portion 806 is aligned along the Z-axis and the side-facing portion 810 is aligned along the X-axis. The lens adapter 802 may be permanently attached to the image capture device 800 or removably attached to the image capture device 800. In some implementations, the lens adapter 802 may include a swivel mechanism such that the lens adapter 802 can be adjustably attached to the image capture device 800 to allow for a user to variably adjust the direction of the lens adapter 802 to reduce the profile of the image capture device 800 when mounted to a mounting device, such as the helmet 804.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lens adapter for an image capture device, comprising:
a first lens assembly comprising lenses configured to refract light incident from an outer lens of the lenses into collimated light;
an optical device configured to alter a direction of the collimated light and direct the collimated light to an image capture device lens assembly; and
a mount end configured to removably attach the lens adapter to the image capture device via a mounting interface that includes a hinge rotatably coupled with a pin to support sealing engagement between the lens adapter and the image capture device.

2. The lens adapter of claim 1, wherein the optical device is a front silvered mirror at about 45 degrees.

3. The lens adapter of claim 1, wherein the optical device is a prism.

4. The lens adapter of claim 3, wherein the prism comprises glass, plastic, or ceramic.

5. The lens adapter of claim 1, further comprising:
a second mount end configured to removably attach an optical component to the lens adapter.

6. The lens adapter of claim 1, wherein the mount end includes a swivel mechanism to variably adjust a direction of an imaging axis of the lens adapter.

7. The lens adapter of claim 1, wherein the mount end is configured to removably attach the lens adapter to the image capture device in a top-facing configuration.

8. The lens adapter of claim 1, wherein the mount end is configured to removably attach the lens adapter to the image capture device in a side-facing configuration.

9. An image capture system, comprising:
an image capture device comprising:
a first lens assembly; and
a mounting interface; and
a lens adapter comprising:
a second lens assembly comprising lenses configured to refract light incident from an outer lens of the lenses into collimated light;
an optical device configured to alter a direction of the collimated light and direct the collimated light to the first lens assembly; and
a mount end configured to removably attach the lens adapter to the mounting interface of the image capture device, wherein the mounting interface includes a hinge rotatably coupled with a pin to support sealing engagement between the lens adapter and the image capture device.

10. The image capture system of claim 9, wherein the optical device is a front silvered mirror at about 45 degrees.

11. The image capture system of claim 9, wherein the optical device is a prism.

12. The image capture system of claim 11, wherein the prism comprises glass, plastic, or ceramic.

13. The image capture system of claim 9, wherein the lens adapter further comprises:
a second mount end configured to removably attach an optical component to the lens adapter.

14. The image capture system of claim 9, wherein the mount end includes a swivel mechanism to variably adjust a direction of an imaging axis of the lens adapter.

15. The image capture system of claim 9, wherein the mount end is configured to removably attach the lens adapter to the mounting interface of the image capture device in a top-facing configuration.

16. The image capture system of claim 9, wherein the mount end is configured to removably attach the lens adapter to the mounting interface of the image capture device in a side-facing configuration.

17. An image capture system, comprising:
a lens adapter; and
an image capture device comprising:
  a first lens assembly; and
  a mounting interface configured to attach the lens adapter in a top-facing configuration or a side-facing configuration;
the lens adapter comprising:
  a second lens assembly comprising lenses configured to refract light incident from an outer lens of the lenses into collimated light;

an optical device configured to alter a direction of the collimated light and direct the collimated light to the first lens assembly; and
  a mount end configured to removably attach the lens adapter to the mounting interface of the image capture device, wherein the mounting interface includes a hinge rotatably coupled with a pin to support sealing engagement between the lens adapter and the image capture device.

18. The image capture system of claim 17, wherein the optical device is a front silvered mirror at about 45 degrees.

19. The image capture system of claim 17, wherein the optical device is a prism.

20. The image capture system of claim 19, wherein the prism comprises glass, plastic, or ceramic.

\*   \*   \*   \*   \*